(12) United States Patent
Sullivan et al.

(10) Patent No.: US 7,337,141 B2
(45) Date of Patent: Feb. 26, 2008

(54) HEDGING EMPLOYEE STOCK OPTIONS

(75) Inventors: Colleen Sullivan, Chicago, IL (US);
Joseph Klein, Chicago, IL (US);
Joseph Kelly, Seattle, WA (US)

(73) Assignee: iOptions, Chicago, IL (US)

( * ) Notice: Subject to any disclaimer, the term of this patent is extended or adjusted under 35 U.S.C. 154(b) by 1043 days.

(21) Appl. No.: 10/126,756

(22) Filed: Apr. 19, 2002

(65) Prior Publication Data

US 2002/0194136 A1 Dec. 19, 2002

Related U.S. Application Data

(60) Provisional application No. 60/285,660, filed on Apr. 20, 2001.

(51) Int. Cl.
*G06Q 40/00* (2006.01)
(52) U.S. Cl. .................. 705/37; 705/36 R; 705/36 T
(58) Field of Classification Search .............. 705/1, 705/37, 36 R, 36 T
See application file for complete search history.

(56) References Cited

U.S. PATENT DOCUMENTS

| | | | | |
|---|---|---|---|---|
| 5,038,284 | A * | 8/1991 | Kramer ....................... | 705/37 |
| 5,227,967 | A * | 7/1993 | Bailey ......................... | 705/35 |
| 5,797,127 | A * | 8/1998 | Walker et al. ................ | 705/5 |
| 5,806,047 | A * | 9/1998 | Hackel et al. ............. | 705/36 R |
| 6,263,321 | B1 * | 7/2001 | Daughtery, III ........... | 705/36 R |
| 6,269,346 | B1 * | 7/2001 | Cristofich et al. ........ | 705/36 R |
| 6,360,210 | B1 * | 3/2002 | Wallman ................... | 705/36 R |
| 6,766,303 | B2 * | 7/2004 | Marshall ................... | 705/36 R |
| 2001/0056391 | A1 | 12/2001 | Schultz | |
| 2002/0032636 | A1 * | 3/2002 | Shields et al. ................ | 705/37 |
| 2002/0174044 | A1 * | 11/2002 | Marshall ...................... | 705/36 |
| 2002/0194105 | A1 * | 12/2002 | Klein .......................... | 705/37 |
| 2003/0093354 | A1 * | 5/2003 | Marshall ...................... | 705/36 |

OTHER PUBLICATIONS

Knight ("Options Are Usually Best Left to the Pros, But LEAPS Might Help the Common Folk; [FINAL Edition]", The Washington Post. Washington, D.C.; Jan. 29, 2001. p. E.1.).*

"Collars: Time to play it safe", optionprophet web site, Oct. 1998, pp. 1-3.

"O.K. You Have the Options: Now What?", optionprophet web site, Jan. 28, 1999, pp. 1-2.

"Covered Calls: Worth Millions, Living Like a Paupet", optionprophet web site, Oct. 1998, pp. 1-2.

Robert Gordon, "Hedging Appreciated Stock Options: Tax Economic and Regulatory Concerns", web site, published 2000, pp. 1-5.

David M. Shizer, "Executive Stock Options and Derivatives: Tax as Corporate Governance Ally", The Center for Law and Economic Studies, Columbia Law School, Nov. 7, 1999, pp. 1-74.

"Using Listed Stock Options as an 'Insurance' Vehicle", myoptionvalue web site, published 2000, pp. 1-3.

"Myoptionvalue.com Adds New Features to Protect Stock Options Gains From Stock Declines", PRN Newswire release, Sep. 12, 2000, pp. 1-2.

Kathleen Pender, "Online Investing, 5 sites Offer Help Managing Options", Sep. 19, 2000, pp. 1-6.

Wade Williams, "Protecting Your Employee Stock Option Gains", Foundation For Enterprise Development web site, Oct. 2000, pp. 1-7.

* cited by examiner

*Primary Examiner*—Jagdish N Patel
(74) *Attorney, Agent, or Firm*—McDonnell Boehnen Hulbert & Berghoff LLP

(57) ABSTRACT

An efficient process, from both a regulatory and tax perspective, for individuals to hedge employee stock options. No margin is required for a listed call option written on an equity security when the account holds a "long" position in a vested employee stock option which can be immediately exercised without restriction (not including the payment of money) to purchase an equal or greater quantity of the security underlying the listed option provided that the vested employee stock option does not expire before the short listed call option, and provided that the amount (if any) by which the exercise price of the vested employee stock option exceeds the exercise price of the short listed call option is held in or deposited to the account.

44 Claims, No Drawings

HEDGING EMPLOYEE STOCK OPTIONS

RELATED APPLICATIONS

This application claims priority to and the benefit of U.S. Provisional Patent Application No. 60/285,660 filed on Apr. 20, 2001.

BACKGROUND OF THE INVENTION

Individuals may have a substantial portion of their net worth concentrated in their company's stock, either through direct common stock holdings or derivatives such as employee stock options. Tax and regulatory restrictions have generally left few economically efficient alternatives for holders of these equity positions to diversify their risk. These restrictions are most onerous for holders of employee stock options seeking to generate additional income and/or manage the risk associated with the issuer/employer's common stock.

Presently, unlike freely tradable shares of stock, employee stock options are generally not transferable and most significantly do not have margin value. Therefore, investors hedging employee stock options by selling listed equity options, such as call options, are required to post other acceptable collateral to meet margin requirements (discussed in further detail below).

In addition, US tax law generally prevents individuals from hedging their employee stock options. Specifically, if the stock underlying an employee stock option appreciates after an individual hedges, employee stock option gains are ordinary in character and corresponding hedging losses are generally capital. Because capital losses cannot offset the tax on ordinary income, the losses are deferred unless the individual has capital gains from other investments.

SUMMARY OF THE INVENTION

The present disclosure creates an efficient process, from both a regulatory and tax perspective, for individuals to hedge employee stock options. First, the present disclosure provides that no margin is required for a listed call option written on an equity security when the account holds a "long" position in a vested employee stock option which can be immediately exercised without restriction (not including the payment of money) to purchase an equal or greater quantity of the security underlying the listed option provided that the vested employee stock option does not expire before the short listed call option, and provided that the amount (if any) by which the exercise price of the vested employee stock option exceeds the exercise price of the short listed call option is held in or deposited to the account.

Second, the present disclosure makes it possible to treat the return on a listed option or over-the-counter option hedge of vested or unvested employee stock options as ordinary instead of capital, thus avoiding the mismatch with the employee stock options' ordinary return and the potential capital loss on the listed option or over-the-counter option hedge. This disclosure treats any losses arising on a closing transaction with respect to the short call option as ordinary losses, provided the optionee makes a valid hedging election pursuant to Internal Revenue Code Section 1221 (a)(7).

DETAILED DESCRIPTION

Option Fundamentals

Derivative Security Utilized to Hedge

A derivative security (e.g., a future, option, forward, or swap) is a security whose value depends on the value of an underlying asset or variable (e.g., the value of a stock option is based in the valuation of the underlying stock to which it refers). Derivative securities, such as futures and options, are now actively traded on many different organized exchanges (e.g., the Chicago Board Options Exchange, the Chicago Board of Trade, the International Securities Exchange, and the American Stock Exchange), while other derivative securities, such as forwards and swaps, are regularly traded outside of exchanges by financial institutions and their corporate clients in what are referred to as over-the-counter markets.

Financial institutions, as well as individual investors, dealing with options or other derivative securities are primarily concerned with hedging the risk of adverse price and market fluctuations, which may affect their potential returns and/or positions in the underlying asset. Specifically, many financial institutions and individuals utilize listed option and/or over-the-counter option hedging strategies for the following reasons:

Liquidity—to generate additional income from an existing equity position and create a measure of downside protection.

Risk Reduction—to reduce or eliminate exposure to underlying stock depreciation and protect the value of the equity position.

Diversification—to reduce the risk of a concentrated equity position by investing in a more balanced, diversified portfolio.

Monetization—to increase liquidity by borrowing money using a protected equity position as collateral.

Tax Deferral—to avoid triggering a taxable sale of the underlying position; therefore, the capital gains tax associated with an outright sale of the securities is deferred.

Over-the-Counter Options Versus Listed Options

In general, an option is a contract giving the holder the right, but not the obligation to buy (call) or sell (put) a specified underlying asset at a prearranged price at either a fixed point in the future (European style) or at any time up to maturity (American style). Options are sold both over-the-counter ("OTC") and on organized exchanges. OTC options are privately negotiated contracts executed outside of the regulated exchange environment. Additionally, there is no central marketplace or clearing house for OTC options. Market-makers, primarily large investment banks and commercial banks, create OTC options for use by a wide range of corporate, individual, and institutional end-users. In contrast, listed equity options trade on organized exchanges. Listed options typically have standardized strike (exercise) prices, maturities and exercise and settlement features. Unless otherwise specified, the options discussed herein are listed options to purchase or sell stock, rather than other options, such as OTC options, index options, foreign currency options, or interest rate options.

Listed options are issued, guaranteed and cleared by the Options Clearing Corporation ("OCC"). The OCC is regulated by the Securities and Exchange Commission and has received a "AAA" credit rating from Standard & Poor's Corporation. The "AAA" credit rating corresponds to the OCC's ability to fulfill its obligations as counter-party for all listed options trades. The OCC is owned proportionately by the exchanges where listed options trade. The OCC acts as the third party in all listed option transactions and buyers and sellers deal directly with the OCC rather than with each other. The OCC is obligated to the buyer of a listed option contract to ensure that the seller performs in accordance with the terms of the contract and will, in turn, hold the seller's broker-dealer liable for performance on the contract. Listed option contracts are considered to be new issues of securities and are subject to the prospectus requirements of the Securities Act of 1933.

Option Basics

There are two basic types of options, call options and put options. A call option gives the holder the right to buy 100 shares of the underlying stock from the seller by a certain date for a certain price. If the holder exercises this right, the seller of the call option is obligated to deliver the stock at the predetermined price per share. A put option gives the holder the right to sell 100 shares of the underlying stock to the seller by a certain date for a certain price. If the holder exercises this right, the seller of the listed put option is obligated to buy the stock at the predetermined price per share. The exercise price, also called the strike price, is the price at which the buyer may buy stock from the seller (in the case of a call option) or sell stock to the seller (in the case of a put option).

Components of Listed Equity Options

A listed option contract is described by the name of the underlying security, the expiration month, the exercise price, and the type of option. The premium represents the market price of the listed option.

For example, a listed call option on IBM stock with an exercise price of $50, a October expiration, and a $4 premium would appear as follows:

| Underlying Security | Expiration Month | Exercise Price | Type of Option | Premium |
|---|---|---|---|---|
| IBM | October | 50 | Call | 4 |

Underlying Security

Each listed equity option represents 100 shares of the underlying stock. In the example above, there are 100 shares of IBM stock underlying the listed option contract.

Expiration of Listed Options

In accordance with the standardized terms of their contracts, all listed equity options expire on a certain date, called the "expiration date." The holder of the listed option has the right to buy or sell the underlying stock at any time until the expiration date. If the listed option has not been exercised prior to expiration, it will cease to exist. In the example above, the buyer may purchase 100 shares of IBM stock from the seller until the expiration date in October.

All listed equity options expire at 11:59 pm EST, on the Saturday following the third Friday of the expiration month. Although the listed equity option does not actually expire until Saturday, customers must initiate their right to buy (in the case of listed call options) or sell (in the case of listed put options) the underlying stock by 5:30 pm EST, on the third Friday of the expiration month. An expiring listed option will cease trading at 4:02 pm EST on the day prior to expiration. A listed equity option that has not been exercised by 11:59 pm EST on the Saturday following the third Friday of the expiration month will expire and become worthless. In order to prevent inadvertent expiration of in-the-money options, the OCC will automatically exercise an option for a customer if the option is in-the-money by $3/4$ point or more and for a member firm if the option is in-the-money by $1/4$ point or more.

It is important to note that the stock may trade above the listed call option's strike price at any time during the life of the listed call option and the listed call option is not automatically exercised. Likewise, the stock may trade below the listed put option's strike price at any time during the life of the listed put option and the listed put option is not automatically exercised.

On occasion buyers do exercise listed equity options before the expiration date, usually only to capture a large dividend on the underlying stock. It is primarily at the expiration of an in-the-money listed equity option that the seller of a listed equity option needs to be concerned about being assigned.

Exercise Price

The exercise price, also called the strike price, is the price at which the buyer may buy stock from the seller (in the case of a listed call option) or sell stock to the seller (in the case of a listed put option). In the example above, the buyer is guaranteed a purchase price of $50 per share for IBM stock, regardless of how high the price of IBM may rise. The aggregate exercise price may be found by multiplying the exercise price by the contract size. The IBM October 50 call has an aggregate exercise price of $5000 (100 shares*$50).

In, At, and Out-of-the-Money

The relationship between the strike price of a listed option and the current market price of the underlying security has a great influence upon the value of a listed option contract.

A listed call option is in-the-money if the market price of the stock is higher than the exercise price of the listed call option.

A listed call option is at-the-money if the market price of the stock is the same as the exercise price of the listed call option.

A listed call option is out-of-the-money if the market price of the stock is lower than the exercise price of the listed call option.

A listed put option is in-the-money if the market price of the stock is lower than the exercise price of the listed put option.

A listed put option is at-the-money if the market price is the same as the exercise price of the listed put option.

A listed put option is out-of-the-money if the market price of the stock is higher than the exercise price of the listed put option.

Premium

The premium is the market price of a listed option at a particular time. It is paid by the buyer to the seller for the rights conveyed by the contract. The potential loss to the buyer of a listed option can be no greater than the initial premium paid for the contract, regardless of the performance of the underlying stock. This allows the investor to control the amount of risk assumed. On the contrary, the seller of a listed option, in return for the premium received from the buyer, assumes the risk of being assigned if the contract is exercised.

The premium is the only component of the listed option that is not standardized. It is determined on the floor of the exchange between buyers and sellers.

Margin Requirements

Customers purchasing securities may pay for them in full or borrow a portion of the purchase price from the broker-dealer. The amount borrowed from the brokerage firm represents the customer's debit balance. The amount the customer is required to deposit is known as margin. Purchasing securities on margin allows investors to leverage their investments. Leverage involves the ability to increase return with increasing investment.

The extension of credit by a broker-dealer to a customer is regulated by the Federal Reserve Board under Regulation T of the Securities Exchange Act of 1934. Accordingly, option contracts are subject to the margin requirements set forth by the Federal Reserve Board under Regulation T. Regulation T mandates that margin requirements for options are specified by the rules of the registered national securities exchange authorized to trade the option, provided that all such rules have been approved or amended by the Securities and Exchange Commission. Option contracts are also subject to the maintenance requirements of the organized exchanges and each brokerage firm.

It is important to note that under Regulation T, option contracts have no loan value and cannot be purchased on margin. Accordingly, buyers of options must deposit the full purchase price, whether an option is bought in a cash account or a margin account.

Covered Versus Uncovered Call Writing

The writer or seller of call options may be classified as being either covered or uncovered (also referred to as "naked" call writing). The covered call writer owns the stock underlying the option (or a security convertible into the underlying stock, an escrow receipt, or a long warrant) and is not required to make a margin deposit (e.g., the stock, escrow receipt, convertible security or warrant is considered cover in lieu of the margin otherwise required on a short listed call option position). In addition, covered writing may be done in a margin account or a cash account. The uncovered writer does not own the underlying stock and must meet the short listed call option margin requirement. The basic margin requirement for an uncovered call or put option is the current premium plus 20% of the current market value of the underlying stock minus any amount that the contract is out-of-the-money. Uncovered writing transactions must be done in a margin account.

Covered call writing is less risky than uncovered call writing because if the option is exercised, the investor does not have to go into the market and purchase the underlying stock. The covered writer will simply deliver the shares already owned. The disadvantage to this strategy is that by agreeing to sell the stock owned at the option strike price, the covered call writer forfeits the opportunity to make an unlimited profit if the stock's price advances. Also, the writer of a covered call is still exposed to loss if the market price of the underlying stock declines. In contrast, uncovered call writing is considered to be the riskiest option strategy because an uncovered call writer is exposed to unlimited risk. If the buyer exercises the call, the writer is obligated to deliver the underlying stock. Since the uncovered writer does not own the stock, the investor must first purchase it in the marketplace at the current market price. There is no limit as to how high the price may rise.

Market-Makers

Most option exchanges use a market maker system to facilitate trading. A market maker for a certain option is an entity (person or computer program) who will quote both a bid and an ask price on the option when requested to do so by a broker. The bid is the price at which the market maker is prepared to buy and the ask is the price at which the market maker is prepared to sell. The ask is higher than the bid and the amount by which the ask exceeds the bid is referred to as the bid-ask spread. The exchange sets limits for the width of the bid-ask spread. Market makers provide liquidity so buy and sell orders may usually be executed at some price without any significant delays. The market makers themselves make their profits from the bid-ask spread.

Regulatory Disclosure—Employee Stock Options and Margin

Under current margin regulations and practice, employee stock options are not considered cover in lieu of the margin required for a short-listed call option position. However, requiring no margin on the writing of listed calls against vested employee stock options dovetails with current margin practice in respect of writing call options versus long warrants and escrow agreements (e.g., long warrants and escrow agreements may be utilized as cover in lieu of margin for purposes of establishing a short call option position).

For example, margin is not required for a listed call option written on an equity security when the account holds a net long position in a warrant which can be immediately exercised without restriction to purchase an equal or greater quantity of the security underlying the option provided that the warrant does not expire before the short call and provided that the amount (if any) by which the exercise price of the warrant exceeds the exercise price of the short call is held in or deposited in the account.

A warrant is an instrument issued by a corporation giving to the holder the right to purchase the capital stock of the corporation at a stated price either prior to a stipulated date or at any future time. Warrants are similar to employee stock options in that they are both instruments that give their holders the right to buy a specified amount of stock at a specified time for a specified price. Further, warrants are oftentimes granted in a compensatory context in which they are not traded and are limited in transferability, thus employee stock options are essentially the equivalent of warrants.

Presently, unlike freely tradable shares of stock, employee stock options are generally not transferable and most significantly, do not have margin value. Unvested employee stock options are not marginable for the following reasons. If the employee stock options are not exercisable due to vesting (i.e., unvested), the investor has unlimited risk if the stock increases above the strike price of the listed call option. If the listed call options are exercised (assigned), the seller will be obligated to deliver the shares underlying the transaction. If the investor does not own the underlying stock or cannot exercise employee stock options to acquire the stock, the investor will need other assets to settle the obligations. The investor's exposure will increase as the stock price appreciates.

This risk can be reduced if the employee owns vested employee stock options that are currently exercisable. For margin purposes, a holder of vested employee stock options that can be exercised into freely tradable stock, should be treated as if he or she is "long" the underlying stock. Therefore, investors hedging employee stock options by selling listed equity options, such as call options, are required to post other acceptable collateral to meet the margin requirements, generally cash. The margin requirement is based on the value of the underlying stock and the strike price of the option. In the case of a call option, the investor is required to post additional margin if the underlying stock price rises. Accordingly, while posting the margin necessary to engage in these transactions is not an obstacle for high-net-worth individuals, it is a very large barrier for those deemed "paper rich, cash poor," as these individuals usually do not have the cash necessary to meet margin requirements. Below is an example of the way in which these transactions are effected today.

For example, in September 2000, Employee holds 10,000 fully vested employee stock options with an exercise price of $50 per share and the Issuer/Employer's stock is currently trading at $100 per share.

In September, Employee, utilizing only 1000 of his or her fully vested employee stock options, sells (writes) 10 November calls with a strike price of $120 for $5 each, thereby allowing employee to collect $5000 in premium from the sale of the 10 listed call options. Prior to entering into this transaction, Employee deposits into his or her brokerage account the margin necessary to enter into the transaction. Minimum margin requirements are currently imposed by the Board of Governors of the Federal Reserve System, the options markets and other self-regulatory organizations. Higher margin requirements may be imposed either generally or in individual cases by the various brokerage firms. To enter into the above transaction, Employee must deposit approximately $25,000 ($25,000=20% of current value of underlying stock (1000 shares *$100)=$20,000+premium ($5000)) of margin into his or her brokerage account. Further, if the underlying stock price rises, the Employee may have to post additional margin.

Once the transaction is executed, Employee collects $5000 in premium from the sale of the 10 listed call options.

If, at the listed option expiration on the third Friday in November, the stock is trading above $120, the 10 listed call options are assigned and Employee immediately submits "cashless exercise" instructions to his or her broker to exercise 1000 of his or her employee stock options into 1000 shares of Issuer/Employer's stock.

Accordingly, 1000 of Employee's employee stock options are exercised at a price of $120 on a "cashless exercise" basis pursuant to the Employee's instructions. The broker-dealer delivers to the Issuer/Employer the amount of money necessary to fund the employee stock option exercise. Once the broker-dealer has received the proceeds of the sale on settlement date, a portion of the proceeds from the sale of the stock is used to pay back both the monies advanced by the broker-dealer to the Employee to effect the exercise of the employee stock options as well as the brokerage commission due. The remainder of the proceeds are paid to the Employee.

Alternatively, if at the listed option expiration on the third Friday in November, the stock is trading below $120, the listed options expire worthless, the Employee retains his or her employee stock options, keeps the $5000 collected in premium and the transaction closes.

Regulatory Disclosure—Vested Employee Stock Options as Margin

According to an illustrative embodiment of the invention, no margin is required for a call option written on an equity security when the account holds a "long" position in a vested employee stock option that can be immediately exercised without restriction (not including the payment of money) to purchase an equal or greater quantity of the security underlying the listed call option provided that the vested employee stock option does not expire before the short listed call option, and provided that the amount (if any) by which the exercise price of the vested employee stock option exceeds the exercise price of the short listed call option is held in or deposited to the account.

In accordance with an embodiment of the invention, customers are permitted to sell listed call options on the same underlying security as their vested employee stock options without the requirement of margin. To engage in these transactions, however, certain documents by and between the broker-dealer, the customer, and the issuer/employer must be in place. Collectively, these documents guarantee that the broker-dealer has control over the vested employee stock options, and thus the delivery of the corresponding stock, if and when exercise of the employee stock options is deemed necessary. In addition, issues such as forfeiture, pledging and transfer restrictions and non-standardization of employee stock option plans are mitigated through representations made by the issuer/employer and customer in these documents.

In one embodiment of the invention, prior to the sale of any listed call options in the customer's brokerage account, the following documents will be in place. In one document, the broker-dealer obtains a properly executed exercise notice from the customer. This notice contains instructions to the issuer/employer to deliver the stock in good deliverable form to the broker-dealer or its agent no later than three (3) business days after receipt of the employee stock option exercise notification. Through this document, the customer instructs the broker-dealer to submit the notice to the issuer/employer, on the customer's behalf, if and only when the listed call options are assigned. In another document, the broker-dealer has an agreement in place with the issuer/employer, wherein the issuer/employer agrees to accept the employee's (e.g., the customer) properly executed exercise notice from the broker-dealer and deliver the corresponding stock in good deliverable form to the broker-dealer no later than three (3) business days after proper exercise notification.

According to a further embodiment, if and when exercise of the vested employee stock options is required, the customer does not have to render the funds to pay the exercise price, rather the broker-dealer offers a traditional "cashless exercise" of the employee stock options and advances the exercise price of the options to the issuer/employer, thus ensuring prompt delivery of the underlying stock by the issuer/employer. Because the broker-dealer has the necessary control to exercise the employee stock options and is assured that the security will be promptly delivered by the issuer/employer, this transaction carries no more risk than if the customer actually held the stock in an account.

Described below is one example of how listed options to hedge vested employee stock options can work when following the illustrative hedging method of the invention.

For example, in September 2000, Employee holds 10,000 fully vested employee stock options with an exercise price of $50 per share and the Issuer/Employer's stock is currently trading at $100 per share.

For example, in September, Employee, utilizing only 1000 of his or her fully vested employee stock options, sells (writes) 10 November calls with a strike price of $120 for $5 each, thereby allowing Employee to collect $5000 in premium from the sale of the 10 listed call options. Unlike the prior example, Employee is not required to deposit margin into his or her brokerage account. Specifically, Employee does not have to deposit $25,000 of margin into the account. Instead, prior to entering into this transaction, Employee delivers the above mentioned documents to the broker-dealer carrying the Employee's account.

If the stock is trading above $120 on the listed option expiration on the third Friday in November, the 10 listed call options are assigned and 1000 of Employee's employee stock options are exercised at a price of $120 on a "cashless exercise" basis pursuant to the documents. Similar to a traditional "cashless exercise," the broker-dealer delivers to the Issuer/Employer the amount of money necessary to fund the employee stock option exercise. Once the broker-dealer has received the proceeds of the sale on settlement date, a portion of the proceeds from the sale of the stock is used to pay back both the monies advanced by the broker-dealer to the Employee to effect the exercise of the employee stock options as well as the brokerage commission due. The remainder of the proceeds will be paid to the Employee.

Alternatively, if at the listed option expiration on the third Friday in November, the stock is trading below $120, the listed call options expire worthless, the Employee retains his or her employee stock options, keeps the $5000 collected in premium and the transaction closes.

The illustrative embodiment of the hedging technique of the invention enables holders of vested employee stock options to realize multiple benefits. One benefit is that those individuals typically deemed "paper rich, cash poor" are now able to generate liquidity and protect their vested employee stock options without being required to meet substantial margin requirements. Specifically, in accordance with the above example, Employee is not required to deposit $25,000 in cash to engage in this transaction. Another benefit is that, in contrast to conventional approaches, individuals who enter into the transactions of the above example, using the methodology of the invention, are not required to meet calls for substantial additional margin in the event of adverse market movements. Without the methodology of the invention, these transactions are viewed as uncovered or "naked" options positions. Under such a paradigm, a customer is required to deposit and maintain sufficient margin with his or her broker to assure that the stock can be purchased for delivery if and when the listed call option is assigned. Thus, individuals who enter into these transactions are deemed uncovered or "naked" option writers and may have to meet calls for substantial additional margin in the event of adverse market movements. The illustrative hedging technique of the invention eliminates these types of margin calls.

Tax Disclosure—Character Mismatch

The tax considerations that arise from hedging vested or unvested employee stock options are complex. One primary difficulty encountered in hedging employee stock options from a tax perspective is that all gains from the underlying employee stock option are typically taxed as ordinary income. By contrast, gains or losses from any non-employee (exchange-traded or OTC) stock option hedges are treated as capital gains or losses.

If the stock underlying the employee stock option appreciates after the individual hedges, employee stock option gains are ordinary and corresponding hedging losses generally are capital. Because capital losses cannot offset more than $3000 of ordinary income, the bulk of the capital losses will be deferred until the individual has capital gains from other investments.

For example, assume an individual has employee stock options to buy 10,000 shares of company stock at $10, and the stock is currently trading at $100. The individual enters into a "collar" that leaves him or her exposed to price fluctuations between $90 and $110. The collar is formed when the individual buys a listed or OTC put option at $90 and sells a listed or OTC call option at $110 ($100,000 to exercise ($10 *10,000). As a result of the put option, the, individual may sell the stock at $90 (regardless of how far stock price falls). Therefore, the individual is assured pre-tax profits of $800,000 (900,000−100,000=800,000)). The collar both protects the individual from his or her risk of loss by allowing him or her to sell the underlying stock for $90, and limits his or her opportunity for gain by obligating him or her to sell for $110. Thus, the individual's pre-tax profit is guaranteed to be at least $800,000 and could be as much as $1 million. Yet, as the table below shows, individuals who cannot use their capital losses find this pretax gain eroded—indeed, it can turn into a loss—as the underlying stock appreciates.

For example, if the stock price rises to $200, the individual nets a $1 million pre-tax profit. In addition, the option has an extra $900,000 of ordinary income on the employee stock option and a corresponding $900,000 capital loss on the hedge. However, the individual cannot use this loss to avoid tax on the ordinary income. Assuming the individual does not have capital gains from another investment, his or her tax bill rises by $356,400 (i.e., 39.6 * 900,000), making his or her total current tax bill ($752,400) more than 75% of his or her economic profit. Moreover, the table shows that if the price increases to $300, the individual's $1.14 million current tax bill exceeds his or her $1 million economic profit.

Tax Environment Without the Illustrative Methodology of the Invention—90-110 Collar on Employee Stock Option with $10 Grant (Exercise) Price

| | |
|---|---|
| Stock Price at Maturity | 200 |
| Stock Price at Time of Hedge | 100 |
| Economic Gain | 1 million |
| Taxable Income from Employee Stock Option | 1.9 million (2 million − 100,000) |
| Deferred Capital Loss from Hedge | 900,000 (1.1 million-2 million) |
| Current Tax Bill | 752,400 (39.6 * 1.9 million) |
| After-tax Cash | 247,600 (1 million − 752,400) |

Because capital loss on the hedge is potentially unlimited, since it grows with the company's stock price, not all individuals will be sure, ex ante, of having enough capital gains to use all their capital losses. The individual thus bears a risk without any offsetting reward, because having capital gains allows him or her, at most to break even. Moreover, even individuals who expect to have capital gains, could be forced to recognize it prematurely.

Tax Disclosure—Elimination of Character Mismatch when Utilizing Options to Hedge Employee Stock Options According to a further embodiment, the methodology of the invention makes it possible to treat the return on the hedge as ordinary instead of capital, thus avoiding the mismatch with the employee stock options' ordinary return and the potential capital loss on the hedge. The illustrative methodology of the invention treats any losses arising on a closing transaction with respect to the short call as ordinary losses. In one embodiment, the individual achieves ordinary loss treatment by making a hedging election pursuant to Internal Revenue Code Section 1221 (a)(7), which is normally used only for "non-employee" stock options. The unique application of the hedging election to employee stock options enables the individual to character match the gains/losses encountered when hedging employee stock options and thereby potentially provides the individual with a reduced tax burden.

In the absence of the illustrative methodology of the invention, losses with respect to written calls are generally treated as short-term capital losses in the case of a non-dealer employee. The illustrative methodology of the invention recognizes that when an individual hedges an employee stock option by selling a short call, the hedge can be characterized as a hedging transaction as defined in Section 1221(a)(7) of the Internal Revenue Code and Treasury Regulation Section 1.1234-4, which thereby entitles the employee stock option hedge to treatment as an exception to capital loss treatment in the case of written call options that are part of a hedging transaction. One advantage of using the methodology of the invention is that any losses arising on a closing transaction with respect to the short call is treated as ordinary losses for tax purposes, provided the individual makes the hedging election discussed above.

Tax Environment Using the Illustrative Methodology of the Invention:—90-110 Collar on Employee Stock Option with $10 Grant (Exercise) Price

|  | Tax Environment Without Illustrative Methodology | Tax Environment With Illustrative Methodology |
|---|---|---|
| Stock Price at Maturity | 200 | 200 |
| Stock Price at Time of Hedge | 100 | 100 |
| Economic Gain | 1 million | 1 million |
| Taxable Income from Employee Stock Option | 1.9 million (2 million − 100,000) | 1.9 million (2 million − 100,000) |
| Deferred Capital Loss from Hedge | 900,000 (1.1 million-2 million) | 0 (entire 900,000 loss is treated as an ordinary loss and therefore not deferred) |
| Current Tax Bill | 752,400 (39.6 * 1.9 million) | 396,000 (39.6 * 1 million) |
| After-tax Cash | 247,600 (1 million − 752,400) | 604,000 (1 million − 396,000) |

In one illustrative embodiment, the employee stock option hedging methodology of the invention is performed by a computer program in support of trading transactions requested by brokers who are authorized to operate in an exchange that allows trading in such employee stock options. The computer program can, for example, be hosted on a computer system that is accessible by the broker and which is coupled to a market maker via a communications network (e.g., LAN, MAN, WAN). The computer program receives trading request inputs from a broker or investor, processes the inputs, provides a transaction request to the market maker, and receives confirmation from the market maker that the employee stock option hedge has been implemented according to a particular bid-ask spread. The program can also display details of the transaction and transaction request to the broker or investor, send an electronic confirmation of the transaction to the broker, investor, or other predetermined party (e.g., the other party to the hedging transaction and/or to representatives of the exchange, SEC, or tax authority), and cause a transaction report to be prepared. The program can also be configured to terminate the employee stock option hedge by sending instructions to the market maker to exercise the employee stock option. In an alternative embodiment, the illustrative employee stock option hedging methodology is performed by a computer program that also performs the market making activities of the exchange.

In another illustrative embodiment, the employee stock option hedging methodology is incorporated within a computer program that provides an investment advisor or investor with the expected financial outcomes (including tax consequences) of the employee stock option hedge. In this illustrative embodiment, the computer program can receive a proposed transaction request, process the proposed transaction using real or simulated information (i.e., parameters specified by the investment advisor or investor), determine the financial and tax outcome of the transaction given current market conditions or in view of simulated market conditions, and display the financial results to the investment advisor or investor.

In one embodiment, the computer program can be a standalone program that is not coupled to external data feeds (e.g., financial information service providers) or communication networks. In another embodiment, the computer program is coupled to external data feeds and or local data sources (e.g., financial data on a CD-ROM), but not to brokers or other entities capable of executing the proposed hedging transaction. In yet another embodiment, the computer program is coupled to external data feeds and/or local data sources as well as to brokers and/or market makers so that if the investor agrees to the proposed transaction, a corresponding transaction request can be generated to establish the employee stock option hedge as described above. In one particularly advantageous embodiment, the employee stock option hedging transaction is performed by a computer program operating on a web server that is accessible via the Internet.

The computer program can also be adapted to allow multi-user access at the same time so that an investment advisor and investor can "share" the program and thereby view and interact with the same output data during the employee stock option hedge decision/evaluation process. The computer program can also be adapted to aggregate employee stock option hedge transaction requests from a plurality of users and to present a corresponding single transaction request to a broker or market maker. In this manner, the program can leverage the smaller individual transaction requests into a larger single transaction that may result in reduced brokerage fees or in a narrower bid-ask spread.

Described herein is a method for hedging a particular asset by which certain persons may hedge the risk associated with said asset. The method further includes hedging an employee stock option by selling listed equity options, using said employee stock options as collateral. The method further includes hedging employee stock options by selling listed equity options without the requirement of margin. The employee stock options can be immediately exercised without restriction (not including the payment of money) to purchase an equal or greater quantity of the security underlying the listed equity option provided that the employee stock option does not expire before the listed call option, and provided that the amount (if any) by which the exercise price of the employee stock option exceeds the exercise price of the listed call option is held in or deposited into an account. The method further includes the tax treatment of the return on a listed equity option or over-the-counter option hedge of a particular asset or employee stock option as ordinary instead of capital. The method further includes the tax treatment of any losses on the call option sold as ordinary losses, provided certain persons make a valid hedging election pursuant to certain sections of the Internal Revenue Code.

What is claimed is:

1. A method of hedging employee stock options for company stock comprising the steps of:
   a broker-dealer receiving an exercise notice from a holder of employee stock options, the employee stock options being associated with a company stock, wherein the exercise notice includes instructions to an issuer of employee stock options to deliver the company stock to the broker-dealer;
   the broker-dealer accepting the use of the employee stock options as collateral in accordance with the instructions;
   receiving an order from the holder of the employee stock options to write a call option on the company stock, using the employee stock options for collateral for the call option on the company stock;
   executing the order by submitting an electronic transaction request with a computer system;
   obtaining proceeds from the executed order; and,
   providing the proceeds to the holder of the employee stock options.

2. The method of claim 1 wherein the order to write a call option is an order to write an over-the-counter call option.

3. The method of claim 1 wherein the order to write a call option is an order to write a listed call option.

4. The method of claim 1 wherein the step of obtaining stock is performed by a cashless exercise.

5. The method of claim 1 further comprising receiving an acknowledgment that the issuer will accept the exercise notice from the broker dealer prior to executing the order.

6. The method of claim 1 further comprising the step of confirming that the broker dealer has control over the employee stock options.

7. The method of claim 6 wherein the step of confirming that the broker-dealer has control comprises confirming that employee stock options are fully vested.

8. The method of claim 6 wherein the step of confirming that the broker-dealer has control comprises confirming that employee stock options are not subject to forfeiture.

9. The method of claim 6 wherein the step of confirming that the broker-dealer has control comprises confirming that employee stock options are not subject to transfer or pledge restrictions.

10. The method of claim 1 wherein the employee stock options are accepted as collateral on the condition that the expiration date of the employee stock options is not earlier than the expiration date of the call option.

11. The method of claim 1 wherein the order to write a call option has an associated hedging election.

12. The method of claim 1 wherein a loss associated with the call option is treated as an ordinary loss.

13. The method of claim 1, wherein the employee stock option has strike price, and wherein the call option has a strike price, further comprising the step of requiring additional collateral if the call option strike price is less than the employee stock option strike price.

14. The method of claim 1 further comprising the step of buying a put option for the company stock.

15. The method of claim 14 wherein the call option and the put option make an option collar.

16. The method of claim 1 further comprising the steps of:
   performing an assignment of the call option to the holder of employee stock options, the assignment including obligations to deliver company stock;
   presenting the exercise notice to the issuer and obtaining company stock; and
   using the company stock to fulfill the obligations of the assignment.

17. The method of claim 1 further comprising the step of allowing the call option to expire.

18. A method of hedging employee stock options comprising the steps of:
   a broker-dealer receiving an exercise notice from a holder of employee stock options for company stock that authorizes a broker-dealer to exercise the employee stock options to obtain company stock;
   the broker-dealer receiving acknowledgement from an issuer of the employee stock options that the issuer will allow the broker-dealer to exercise the employee stock options in accordance with the terms of the exercise notice;
   the broker-dealer receiving an order from the holder of employee stock options to write a call option on the company stock, and accepting the employee stock options as collateral for writing the call option on the company stock;
   the broker dealer executing the order to write a call option on the company stock by entering a transaction request into a computer system; and
   receiving an electronic confirmation of the executed order.

19. The method of claim 18 further comprising the steps of:
   receiving notification that the call option has been assigned;
   completing an exercise transaction of the employee stock options to obtain the company stock;
   completing an assignment transaction by delivering the company stock at a strike price of the call option; and,
   providing net proceeds of the exercise transaction and the assignment transaction to the holder of the employee stock options.

20. The method of claim 19 wherein the net proceeds is the amount received from the assignment transaction minus a cost of the exercise transaction minus a commission.

21. The method of claim 18 wherein the order from the holder of employee stock options to write a call option has an associated hedging election.

22. The method of claim 18 wherein a loss associated with the call option is treated as an ordinary loss.

23. The method of claim 18 wherein collateral in addition to the employee stock options is required if a strike price of the call options is less than a strike price of the employee stock options.

24. The method of claim 18 wherein the order to write a call option is an order to write an over-the-counter call option.

25. The method of claim 18 wherein the order to write a call option is an order to write a listed call option.

26. The method of claim 18 further comprising the step of using a computer system to transmit an electronic transaction request from a broker-dealer to write a call option on the company stock.

27. The method of claims 1 or 18, further comprising the step of aggregating the order to write a call option from a plurality of users and to present a corresponding single transaction request to a broker or market maker.

28. A method of hedging stock options for company stock comprising the steps of:
obtaining verification from a company that the company authorizes stock option pledges made by stock option grant holders of the company's stock options, wherein a document provides a document recipient with authority necessary to exercise the company stock options so as to qualify the company stock options as accentable collateral;
the document recipient receiving control of company stock options from a holder of company stock options in accordance with the document;
the holder of the company stock options writing a hedge call option on the company stock by entering a transaction request into a computer system, the hedge call option having an expiration date; and
using the company stock options for collateral for the hedge call option.

29. The method of claim 28 further comprising the steps of:
performing an assignment of the hedge call option to the holder of company stock options, the assignment including obligations to deliver company stock;
the document recipient obtaining company stock; and
using the company stock to fulfill the obligations of the assignment.

30. The method of claim 28 further comprising the step of allowing the hedge call option to expire.

31. The method of claim 28 wherein the hedge call option is an over-the-counter call option.

32. The method of claim 28 wherein the hedge call option is a listed call option.

33. The method of claim 28 wherein the step of exercising the company stock options to obtain company stock is performed by a cashless exercise.

34. The method of claim 28 further comprising the step of confirming that employee stock options are fully vested.

35. The method of claim 28 wherein the company stock options are accepted as collateral on the condition that the expiration date of the company stock options is not earlier than the expiration date of the hedge call option.

36. The method of claim 28 wherein the hedge call option has an associated hedging election.

37. The method of claim 28 wherein a loss associated with the hedge call option is treated as an ordinary loss.

38. The method of claim 28 further comprising the step of the holder of the company stock options buying a hedge put option for the company stock.

39. The method of claim 38 wherein the hedge call option and the hedge put option make an option collar.

40. A method of hedging company stock options comprising the steps of:
receiving a document from a holder of company stock options for company stock, wherein the document authorizes a recipient to exercise company stock options to obtain company stock;
receiving acknowledgement from an issuer of the company stock options that the issuer will allow the recipient to exercise the company stock options based upon the terms of the document;
based in part on receiving the acknowledgement from the issuer, accenting as collateral the authorization to exercise the company stock options according to terms of the document; and,
the holder of company stock options writing a hedge call option on the company stock by entering a transaction request into a computer system.

41. The method of claim 40 further comprising the steps of:
receiving notification that the hedge call option has been assigned;
completing an exercise transaction of the company stock options to obtain the company stock;
completing an assignment transaction by delivering the company stock at a strike price of the hedge call option; and, providing net proceeds of the exercise transaction and the assignment transaction to the holder of the employee stock options.

42. The method of claim 40 wherein the hedge call option has an associated hedging election.

43. The method of claim 40 wherein a loss associated with the hedge call option is treated as an ordinary loss.

44. The method of claims 28 or 40, further comprising the step of aggregating the hedge call options from a plurality of users and to present a corresponding single transaction request to a broker or market maker.

* * * * *

UNITED STATES PATENT AND TRADEMARK OFFICE
CERTIFICATE OF CORRECTION

| | |
|---|---|
| PATENT NO. | : 7,337,141 B2 |
| APPLICATION NO. | : 10/126756 |
| DATED | : February 26, 2008 |
| INVENTOR(S) | : Sullivan et al. |

Page 1 of 1

It is certified that error appears in the above-identified patent and that said Letters Patent is hereby corrected as shown below:

In claim 28, Line 30, "accentable" should read --acceptable--.

In claim 40, Line 29, "accenting" should read --accepting--.

Signed and Sealed this

Thirtieth Day of September, 2008

JON W. DUDAS
*Director of the United States Patent and Trademark Office*

UNITED STATES PATENT AND TRADEMARK OFFICE
CERTIFICATE OF CORRECTION

PATENT NO. : 7,337,141 B2  Page 1 of 1
APPLICATION NO. : 10/126756
DATED : February 26, 2008
INVENTOR(S) : Sullivan et al.

It is certified that error appears in the above-identified patent and that said Letters Patent is hereby corrected as shown below:

Column 15, In claim 28, Line 30, "accentable" should read --acceptable--.

Column 16, In claim 40, Line 29, "accenting" should read --accepting--.

This certificate supersedes the Certificate of Correction issued September 30, 2008.

Signed and Sealed this

Twenty-first Day of October, 2008

JON W. DUDAS
*Director of the United States Patent and Trademark Office*